(12) United States Patent
Stensmo

(10) Patent No.: US 9,064,005 B2
(45) Date of Patent: Jun. 23, 2015

(54) SYSTEM AND METHOD OF FINDING DOCUMENTS RELATED TO OTHER DOCUMENTS AND OF FINDING RELATED WORDS IN RESPONSE TO A QUERY TO REFINE A SEARCH

(75) Inventor: Jan Magnus Stensmo, San Jose, CA (US)

(73) Assignee: Nuance Communications, Inc., Burlington, MA (US)

( * ) Notice: Subject to any disclaimer, the term of this patent is extended or adjusted under 35 U.S.C. 154(b) by 239 days.

(21) Appl. No.: 11/776,634

(22) Filed: Jul. 12, 2007

(65) Prior Publication Data

US 2008/0016050 A1 Jan. 17, 2008

Related U.S. Application Data

(60) Division of application No. 10/062,042, filed on Feb. 1, 2002, now Pat. No. 7,269,546, which is a continuation-in-part of application No. 09/851,675, filed on May 9, 2001, now Pat. No. 6,925,433.

(51) Int. Cl.
*G06F 7/00* (2006.01)
*G06F 17/30* (2006.01)

(52) U.S. Cl.
CPC ............................. *G06F 17/30646* (2013.01)

(58) Field of Classification Search
CPC .................. G06F 17/30687; G06F 17/30672; G06F 17/30448; G06F 17/3069; G06F 17/2818; G06F 19/24; G06F 17/2775; G06F 17/30743; Y10S 707/99933; Y10S 707/99936; G10L 15/197
USPC .................................. 707/5–6, 713, 765–766
See application file for complete search history.

(56) References Cited

U.S. PATENT DOCUMENTS 4,873,630 A * 10/1989 Rusterholz et al. ............... 712/3
4,905,287 A 2/1990 Segawa (Continued)

FOREIGN PATENT DOCUMENTS

| EP | 0 241 183 A1 | 10/1987 |
| EP | 0 539 749 A2 | 5/1993 |

(Continued)

OTHER PUBLICATIONS

Bhatia et al.; Conceptual Clustering in Information Retrieval, 1998 IEEE, vol. 28, No. 3; pp. 427-435.

(Continued)

*Primary Examiner* — Mariela Reyes
*Assistant Examiner* — Linh Black
(74) *Attorney, Agent, or Firm* — Wolf, Greenfield & Sacks, P.C.

(57) ABSTRACT

A computer-implemented system and method is disclosed for retrieving documents using context-dependant probabilistic modeling of words and documents. The present invention uses multiple overlapping vectors to represent each document. Each vector is centered on each of the words in the document and includes the local environment. The vectors are used to build probability models that are used for predictions of related documents and related keywords. The results of the statistical analysis are used for retrieving an indexed document, for extracting features from a document, or for finding a word within a document. The statistical evaluation is also used to evaluate the probability of relation between the key words appearing in the document and building a vocabulary of key words that are generally found together. The results of the analysis are stored in a repository. Searches of the data repository produce a list of related documents and a list of related terms. The user may select from the list of documents and/or from the list of related terms to refine the search and retrieve those documents which meet the search goal of the user with a minimum of extraneous data.

15 Claims, 5 Drawing Sheets

(56) References Cited

U.S. PATENT DOCUMENTS

| | | | |
|---|---|---|---|
| 5,023,912 | A | 6/1991 | Segawa |
| 5,278,980 | A * | 1/1994 | Pedersen et al. .................. 707/4 |
| 5,297,039 | A | 3/1994 | Kanaegami et al. |
| 5,325,298 | A | 6/1994 | Gallant |
| 5,434,777 | A | 7/1995 | Luciw |
| 5,488,725 | A | 1/1996 | Turtle et al. |
| 5,590,242 | A * | 12/1996 | Juang et al. .................. 704/245 |
| 5,619,709 | A | 4/1997 | Caid et al. |
| 5,625,814 | A | 4/1997 | Luciw |
| 5,675,819 | A * | 10/1997 | Schuetze ......................... 704/10 |
| 5,713,016 | A | 1/1998 | Hill |
| 5,724,571 | A | 3/1998 | Woods |
| 5,778,397 | A | 7/1998 | Kupiec et al. |
| 5,794,178 | A | 8/1998 | Caid et al. |
| 5,809,496 | A | 9/1998 | Byrd, Jr. et al. |
| 5,913,185 | A | 6/1999 | Martino et al. |
| 5,918,240 | A | 6/1999 | Kupiec et al. |
| 5,930,787 | A | 7/1999 | Minakuchi et al. |
| 6,012,052 | A * | 1/2000 | Altschuler et al. ................ 707/2 |
| 6,070,133 | A | 5/2000 | Brewster et al. |
| 6,178,420 | B1 | 1/2001 | Sassano |
| 6,192,360 | B1 | 2/2001 | Dumais et al. |
| 6,256,629 | B1 | 7/2001 | Sproat et al. |
| 6,523,026 | B1 * | 2/2003 | Gillis ..................................... 1/1 |
| 6,594,658 | B2 | 7/2003 | Woods |
| 6,622,140 | B1 * | 9/2003 | Kantrowitz ........................... 1/1 |
| 6,675,159 | B1 * | 1/2004 | Lin et al. ............................. 1/1 |
| 6,741,981 | B2 | 5/2004 | McGreevy |
| 6,772,120 | B1 | 8/2004 | Moreno et al. |
| 6,772,146 | B2 * | 8/2004 | Khemlani et al. .......... 705/36 R |
| 6,925,433 | B2 | 8/2005 | Stensmo |
| 7,171,438 | B2 * | 1/2007 | Moudgill et al. ............. 708/552 |
| 7,181,438 | B1 * | 2/2007 | Szabo ............................. 707/2 |
| 7,269,546 | B2 | 9/2007 | Stensmo |
| 7,630,986 | B1 * | 12/2009 | Herz et al. ....................... 707/10 |
| 2001/0042061 | A1 | 11/2001 | Evans |
| 2002/0022956 | A1 * | 2/2002 | Ukrainczyk et al. ............... 704/9 |
| 2002/0042792 | A1 * | 4/2002 | Nishioka et al. .................. 707/5 |
| 2002/0051020 | A1 * | 5/2002 | Ferrari et al. ................. 345/854 |
| 2002/0099685 | A1 * | 7/2002 | Takano et al. ..................... 707/1 |
| 2002/0103789 | A1 * | 8/2002 | Turnbull et al. .................. 707/3 |
| 2002/0103809 | A1 * | 8/2002 | Starzl et al. .................... 707/102 |
| 2002/0107853 | A1 * | 8/2002 | Hofmann et al. ................. 707/7 |
| 2002/0120619 | A1 * | 8/2002 | Marso et al. ...................... 707/3 |
| 2002/0129015 | A1 * | 9/2002 | Caudill et al. .................... 707/6 |
| 2002/0152051 | A1 * | 10/2002 | Fukushige et al. ............ 702/179 |
| 2002/0194158 | A1 * | 12/2002 | Stensmo ........................... 707/2 |
| 2003/0118973 | A1 * | 6/2003 | Noble ............................ 434/167 |
| 2004/0199375 | A1 | 10/2004 | Ehsani et al. |

FOREIGN PATENT DOCUMENTS

| | | |
|---|---|---|
| JP | 11-338883 A | 12/1999 |
| WO | WO 97/46998 A1 | 12/1997 |

OTHER PUBLICATIONS

Shavlik et al., "An instructable, adaptive interface for discovering and monitoring information on the World-Wide Web", Proceedings of the 4th international conference on Intelligent user interfaces, Los Angeles, California, 1998, pp. 157-160.

Lewis et al., "A sequential algorithm for training text classifiers", Proceedings of the 17th annual international ACM SIGIR conference on Research and development in information retrieval, Dublin, Ireland, 1994, pp. 3-12.

Shavlik et al., "Intelligent Agents for Web-based Tasks: An Advice-Taking Approach", AAAI/ICML Workshop on Learning for Text Categorization, 1998.

Pederson, "A simple approach to building ensembles of Naive Bayesian classifiers for word sense disambiguation", Proceedings of the first conference on North American chapter of the Association for Computational Linguistics, Seattle, Washington, 2000.

Efthimiadis, "Query Expansion," Williams, Martha E., ed. Annual Review of Information Systems and Technology (ARIST), v31, pp. 121-187, 1996.

* cited by examiner

SYSTEM AND METHOD OF FINDING DOCUMENTS RELATED TO OTHER DOCUMENTS AND OF FINDING RELATED WORDS IN RESPONSE TO A QUERY TO REFINE A SEARCH

CROSS REFERENCE TO RELATED APPLICATIONS

This application is a divisional application of U.S. Ser. No. 10/062,042 filed Feb. 1, 2002, the disclosure of which is incorporated by reference herein in its entirety.

PRIORITY CLAIM

This application is a divisional application of U.S. Ser. No. 10/062,042, filed Feb. 1, 2002, which claims the priority as a continuation-in-part (CIP) of U.S. patent application Ser. No. 09/851,675, filed on May 9, 2001, which is assigned to the same assignee as the present invention, and which is incorporated herein by reference.

FIELD OF THE INVENTION

This invention generally relates to the field of data and natural language processing, and particularly to a system and associated method for use with a search engine to search data maintained in databases that are linked together over an associated network such as the Internet. More specifically, this invention pertains to a computer software product for processing and retrieving natural language text using probabilistic modeling of words and documents to retrieve resources pertaining to the keywords and words related to the keywords within the context of a current information sphere.

BACKGROUND OF THE INVENTION

The World Wide Web (WWW) is comprised of an expansive network of interconnected computers upon which businesses, governments, groups, and individuals throughout the world maintain inter-linked computer files known as web pages. Users navigate these pages by means of computer software programs commonly known as Internet browsers. Due to the vast number of WWW sites, many web pages have a redundancy of information or share a strong likeness in either function or title. This has increased the need for data analysis systems that assist in the retrieval of information from large databases. The sheer size of such databases makes it difficult to avoid retrieving extraneous information.

In many conventional search and retrieval systems, the user formulates a search request but does not have access to the actual textual data so the user must guess at the proper request to obtain the desired data. One such conventional system for retrieving textual data is a keyword search system. A keyword search system requires the user to enter one or more keywords, and the system conducts a search of the database using these keywords.

If the user knows the exact keywords that will retrieve the desired data, then the keyword search may provide useful results. However, users do not necessarily know the exact keyword or combination of keywords that will produce the desired data. Even when the search and retrieval system retrieves the desired data, the system may also retrieve a large amount of extraneous data that happens to contain the keywords. The user must then sift through all of the extraneous data to find the desired information, typically a time-consuming process.

Another difficulty with conventional keyword based searches relates to the inherent properties of the human language. A keyword selected by the user may not match the words within the text, or may retrieve extraneous information because a user can choose different keywords to describe the same object. For example, one person may call a particular object a "bank" while another person may call the same object a "savings and loan institution."

In addition, the same word may have more than one distinct meaning depending on its context. Because the keyword does not convey information about the desired context of the word, using the keyword "bank" may retrieve text about a riverbank and a savings bank when only articles about a savings bank are desirable.

To overcome these and other problems in searching large databases, considerable research has been done in the areas of statistical natural language processing, also referred to as "text Mining." This research has focused on the generation of simplified representations of documents to facilitate the ability to find desired information among a large number of documents.

One common simplification called a "bag of words" representation ignores the order of words within documents. Each document is represented as a vector consisting of the words in the document regardless of the order of their occurrence. However, this approach loses any information relating to the word context or word order. Therefore, the ability to discriminate desired information based on context and thus respond appropriately to keyword searches is also lost.

Other models have been developed for modeling language that account for sequences of words. However, such models are quite specialized and their implementation can become complicated. Consequently, these models are not very useful for general text mining of large databases or the Internet.

Thus, there is need for improved techniques to assist in searching large databases. To this end, there is also a need for improvements in statistical natural language processing that overcomes the disadvantages of search models used for general text modeling. Currently, models that account for word sequence to keep contextual information lose both search flexibility and the ability to quickly search large databases while the models that can easily and quickly search large databases lose contextual information. The need for such a system has heretofore remained unsatisfied.

SUMMARY OF THE INVENTION

The system and method of the present invention, for context-dependent probabilistic modeling of words and documents for information retrieval and text mining satisfy this need. The present system and method allow the retrieval of documents using context-dependent probabilistic modeling of words and documents. They provide a keyword search engine that is flexible, efficient, and return a minimum of duplicate or extraneous results to the search query.

By using context-dependent probabilistic modeling of words and documents, the system presents to the user a list of high-probability document matches based on the keyword entered by the user. In addition, the system presents a list of context words that can be selected to enhance the keyword search, providing a more efficient search for the user.

The system and method of the present invention use multiple overlapping vectors to represent each document. Each vector is centered on each of the words in the document and includes the word's local environment, i.e., the words that occur close to this word. The vectors are used to build probability models. Several such probability models are used to predict different output variables depending on the intended use of the system.

Context windows are created around each word in each document. The system and method then generate a statistical evaluation of the characteristics of each window. The results of the statistical evaluation are independent of the order of appearance of the words in the window. The statistical evaluation includes the counting of the occurrences of particular words and particular documents and the tabulation of the totals of the counts. These values are used to create the vectors representing the document. Vectors are also created for related words within the document.

By using the window to predict document occurrences, NEAR and ADJACENT operators often used to find relevant search results can be accommodated. For example, NEAR and ADJACENT operators are used in search engines by enclosing a phrase within quotes or connecting words with a dash. The window also is useful when trying to predict the center word from the surrounding words. Many words have multiple meanings, but in one particular context they are often used in one single way.

The vectors are overlapping and each of them contributes their predictions of what their local environment indicates about the entire document and about related terms or keywords. The results of the statistical evaluation are combined such that one answer is provided for various document characterizations, such as text classification, feature extraction, finding related words, query expansion and more.

These results create a fast and efficient method for retrieving a document, extracting features from a document, or for finding a word within a document based on its resulting statistics. The model coefficients are stored together with the index terms. Document and keyword term ranking and lookup are performed concurrently.

The system and method of the present invention reduce the occurrence of non-content words found in the context of search words. The system multiplies the probability of a context word given with the search word with the probability of the search word given with the context word. This "two-way" probability provides a more robust search. For example, the word "value" is important to the word "of", but the word "of" is not important to the word "value", so the system eliminates the word "of" from the search results.

The probabilistic model used by the system of the present invention can be, for example, the Simple Bayes model, though other probabilistic models can alternatively be used. By compressing and storing the coefficients in a novel way resembling inverted indices, the system achieves high efficiency in responding to search queries. The model coefficients are stored together with the index terms such that ranking and lookup are performed concurrently. The system of the invention automatically removes or "prunes" less relevant terms to yield a scalable model.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Crawler: A program that automatically explores the World Wide Web by retrieving a document and recursively retrieving some or all the documents that are linked to it.

Internet: A collection of interconnected public and private computer networks that are linked together with routers by a set of standards protocols to form a global, distributed network.

Search engine: A remotely accessible World Wide Web tool that allows users to conduct keyword searches for information on the Internet.

Server: A software program or a computer that responds to requests from a web browser by returning ("serving") web documents.

URL (Uniform Resource Locator): A unique address that fully specifies the location of a content object on the Internet. The general format of a URL is protocol://server-address/path/filename.

Web browser: A software program that allows users to request and read hypertext documents. The browser gives some means of viewing the contents of web documents and of navigating from one document to another.

Web document or page: A collection of data available on the World Wide Web and identified by a URL. In the simplest, most common case, a web page is a file written in HTML and stored on a web server.

Figure 1:
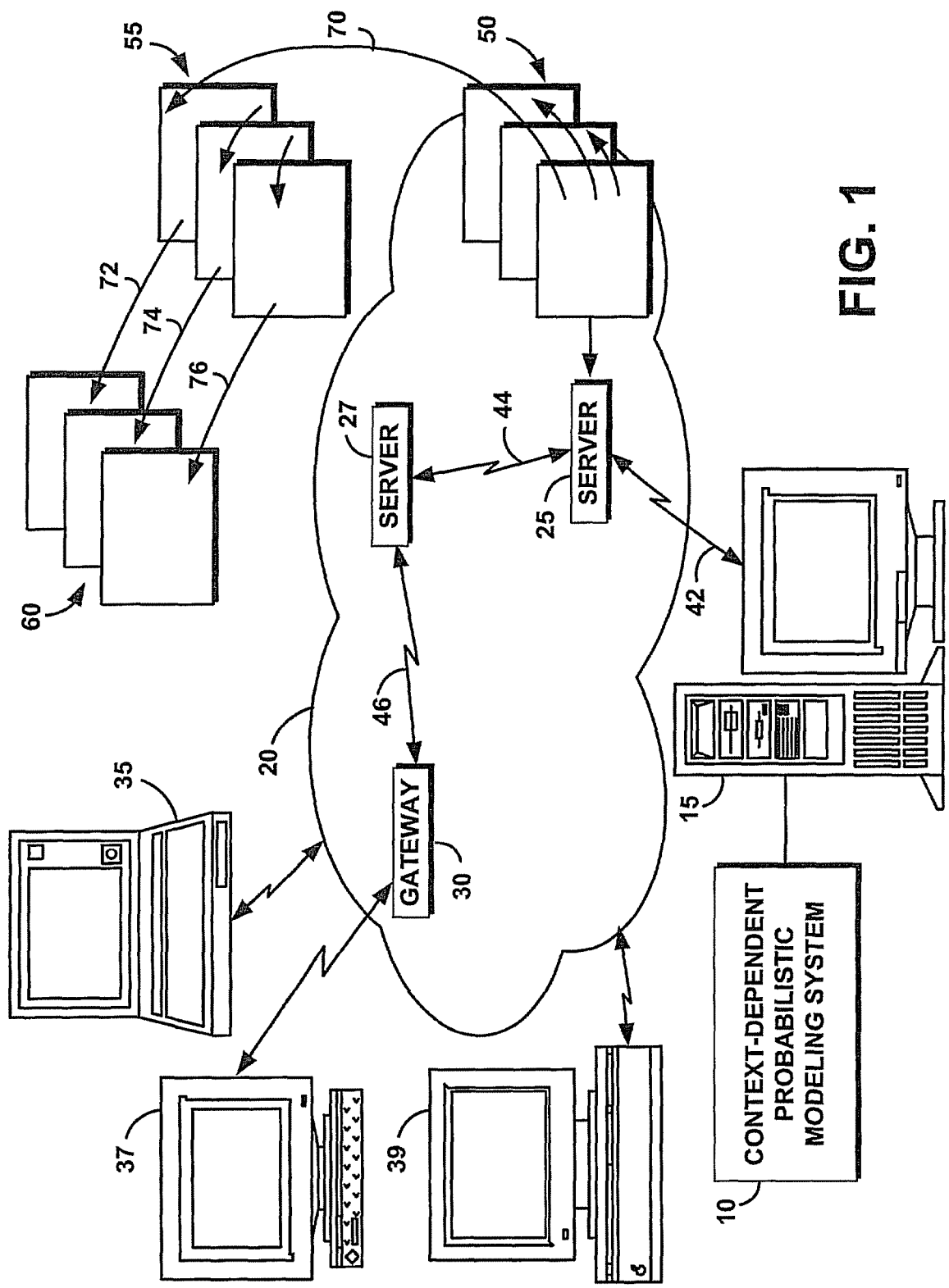
FIG. 1 is a schematic illustration of an exemplary operating environment in which a context-dependent probabilistic modeling system of the present invention may be used.

FIG. 1 portrays the overall environment in which a context-dependent probabilistic modeling system 10 according to the present invention may be used. The system 10 includes a software or computer program product that is typically embedded within or installed on a host server 15. Alternatively, the system 10 can be saved on a suitable storage medium such as a diskette, a CD, a hard drive, or like devices. While the system 10 will be described in connection with the World Wide Web (WWW), the system 10 may be used with a stand-alone database of documents or other text sources that may have been derived from the WWW and/or other sources.

The cloud-like communication network 20 is comprised of communication lines and switches connecting servers such as servers 25, 27, to gateways such as gateway 30. The servers 25, 27 and the gateway 30 provide the communication access to the Internet. Users, such as remote Internet users are represented by a variety of computers such as computers 35, 37, 39, and can query the host server 15 for the desired information.

The host server 15 is connected to the network 20 via a communications link such as a telephone, cable, or satellite link. The servers 25, 27 can be connected via high speed Internet network lines 44, 46 to other computers and gateways. The servers 25, 27 provide access to stored information such as hypertext or web documents indicated generally at 50, 55, and 60. The hypertext documents 50, 55, 60 most likely include embedded hypertext link to other locally stored pages, and hypertext links 70, 72, 74, 76 to other webs sites or documents 55, 60 that are stored by various web servers such as the server 27.

In operation, the system 10 generates multiple overlapping vectors for each document of interest. This document analysis may be performed in conjunction with a web crawler used by an Internet search engine, by the system 10 installed on a user's computer as the user examines or reads documents, or for a database of documents or other text information.

Each vector is centered on each of the words in the document. Therefore, each window includes words that occur close to the particular word, its local environment. These vectors are referred to herein as context windows. The size of the environment is determined when the model is constructed. The order of the words within a local vector is ignored to allow for variations in grammatical styles.

Each document is represented by the system 10 as a collection of vectors. The system 10 uses these vectors to build probability models that are used for prediction. Several models may be used to predict different output variables depending on the intended use of the system. In a preferred embodiment, the occurrence, word, and category membership are modeled for the text. A preferred probabilistic model is Simple Bayes, with the understanding that other probabilistic models may also be used.

Since probabilistic models can be used in many different ways, various attributes can be predicted from the vectors. The resulting representation can be used for information retrieval, finding related words, feature extraction, categorization, category description, etc. The vectors overlap and each of them will contribute what their local environment says about the entire document. The predictions are pooled so that one answer is provided for, e.g., text classification, feature extraction, finding related words, query expansion, text classification, and others. In addition, vectors are created for each keyword in the document, building a relationship between keywords that link like-terms together in the vocabulary of the system 10.

The probabilistic models used by the system 10 are conditional probabilities where the condition is given by words, or context windows. The context windows are constructed by taking the words around each word in a document. This is referred to herein as the environment.

A left parameter and a right parameter are used to control the size of the window. The order of the words within the window is ignored to allow for bad grammar (e.g., telephone transcripts) and varying writing styles. Duplicates are not removed. The word that the window is placed around is not included in the window in the preferred embodiment, but may be included for document and category models.

The Bayes' Rule is described by the following equations:

$$p(d \mid O) = p(d) \frac{p(O \mid d)}{p(O)} \qquad (1)$$

or $$p(d \mid o_1, \ldots, o_M) = p(d) \frac{p(o_1, \ldots, o_M \mid d)}{p(o_1, \ldots, o_M)}, \qquad (2)$$

where d is the variable to be modeled, $O=o_1, \ldots, o_M$ is the context window, and p(d) is the prior probability for variable d. The users' preferences can be encoded in this distribution such that documents or terms deemed more interesting will be favored as determined from prior usage of a retrieval system.

If a text (e.g., a document itself or a sentence) is used for search input, the system 10 creates context windows for the text. Each window is evaluated and the results may be combined as follows:

$$p(d \mid T) = \frac{1}{|T|} \sum_{O \in T} p(d \mid O) \qquad (3)$$

where T is the set of windows created by the overlapping windows positioned over each word in the text. Averaging the probability assessments is preferred, but other combinations are also possible. Since the result is normalized, input length is taken into account. If the input context is smaller than the window size the models can be used directly since the result is equivalent.

The models used by the system 10 can predict the following three models:

Document Model using model p(d|O) where the predicted variable d may or may not be appended with the specific context window number.

Document Category Model using model is p(t|O). The specific context window may also be included in this model.

Word Model in the center of the environment using model p(c|O), where O is the context window.

These models will be now be examined individually. The Document Model uses a document identifier that is modeled from the context window, p(d|O). There are two uses for this model:

To retrieve documents by evaluating p(d|O) with any context and finding the document I.D., d, for which this quantity is maximized, and to extract document features when the formula is reversed so that the conditional probability of a word in a given document is evaluated. The words that have the largest p(d|O) values are features relevant to a particular document, d.

The system 10 builds a word list where all of these words are collected forming a list of content words for each document in the document collection. This list is also used by the system 10 to "prune" the model, as described below.

In the Document Category Model the system 10 models categories similarly to documents, except there can be several categories per document. There are also two uses for this model:

Categorization is performed by evaluating arg max p(t|O), and description of a category is performed by evaluating the opposite, p(o|t), and finding words that are strongly associated with it.

The Word Model finds related words by evaluation of p(c|O), where c is the predicted center word of the context window. The top ranked related words describe the context in which a word occurs, creating a definition of a word. The system 10 performs query expansion by adding words to the keyword query that are related but not mentioned. This expanded query can be used in a regular search engine.

Due to the nature of language, many non-content words will be predicted when such a model is used, consequently it is better to use a list of features extracted for each document by the Document Model as described above. Use of the features list ensures that the system 10 only evaluates content words.

The system 10 uses these models in two additional ways. Documents can be summarized by first calculating the probability of each word in a document given the other words, finding the most informative words. Locating the most informative worlds leads to the most informative sentences and paragraphs, etc. These sentences and paragraphs are used to create summaries. The system 10 then combines queries and query results to form summaries that answer a specific question.

To implement the probability models of the system 10 there are several possibilities to model a joint or conditional probability distribution. The system 10 uses Simple Bayes and Mixture Models for two reasons. First, it is important to have a model that can be evaluated correctly even when input variables are missing. Second, models must be efficient in the high dimensionalities that arise from the use of words as variables.

A model is primarily used since the number of possible combinations of O's members are $2^{|O|}-1$; there is no way to sample them all in any type of text collection. The simplest model to use is Simple Bayes. There are several ways of defining Simple Bayes, two of which are defined herein. These definitions give rise to different formulations and it is useful to consider both. The first one is the "standard" formulation, and the second one is defined in terms of "mutual information".

Simple Bayes standard formulation makes the assumption that words are independent given the class variable:

$$p(o_1, \ldots, o_M \mid d) = \prod_{i=1}^{M} p(o_i \mid d). \tag{4}$$

This Simple Bayes assumption is unrealistic since words in an environment are in general not independent. Although this is the case, these types of models work well in practice and are a useful approximation. Combining equations (2) and (4) yields:

$$p(d \mid o_1, \ldots, o_M) = p(d) \frac{\prod_{i=1}^{M} p(o_i \mid d)}{p(o_1, \ldots, o_M)} \tag{5}$$

It is usually the case that $P(o_1, \ldots, o_M)$ is fixed when evaluating $p(d|o_1, \ldots, o_M)$ over all d. It then becomes a normalizing factor since $$\sum_{i=1}^{N} p(d_i \mid O_1, \ldots, o_M) = 1.$$

Therefore, $$p(d \mid o_1, \ldots, o_M) \propto p(d) \prod_{i=1}^{M} p(o_i \mid d). \tag{6}$$

To use this model is necessary to remember all p(d) and all $p(o_i|d)$. Since $p(o_i|d)$ is defined as $p(o_i, d)/p(d)$ it is necessary to keep track of all pair-wise probabilities $p(o_i, d)$. These probabilities are estimated by counters as described below. For computational reasons it is often useful to write this in logarithmic form:

$$\log p(d \mid o_1, \ldots, o_M) \propto \log p(d) + \prod_{i=1}^{M} \log p(o_i \mid d). \tag{7}$$

This equation shows that a term for each document is added to a term for the conditional probability. These terms have a limited range since they are logarithms. The system 10 stores the rounded integer value of these terms together with the terms in an inverted index-like file. Each entry in the database for a particular term is a list of documents where the term occurs together with the log-term above.

The system 10 also uses an alternate representation of Simple Bayes involving "mutual information". Further assuming, in addition to Equation (4), that the following equation is also valid:

$$p(o_i, \ldots o_M) = \prod_{i=1}^{M} p(o_i). \tag{8}$$

The conditional probability can then be written as:

$$(d \mid o_i, \ldots, o_M) = p(d) \frac{\prod_{i=1}^{M} p(o_i \mid d)}{\prod_{i=1}^{M} p(o_i)} = p(d) \prod_{i=1}^{M} \frac{p(o_i \mid d)}{p(o_i)}. \tag{9}$$

such that $p(o_i|d)/p(o_i)$ is the same as $p(o_i, d)/(p(o_i)p(d))$. Mutual Information, $M_{x,y}$, sometimes called Point-wise Mutual Information, is found by taking the logarithm of the conditional probability calculated in Equation 9. Mutual Information is defined between variables x and y as:

$$M_{x,y} = \log \frac{p(x \mid y)}{p(x)} = \log \frac{p(y \mid x)}{p(y)} = \log \frac{p(x, y)}{p(x)p(y)}. \tag{10}$$

Defining $B_d = \log_2 p(d)$, (10A)

it is possible to rewrite the logarithm of Equation (2) as:

$$\log p(d \mid o_1, \ldots, o_M) = B_d + \prod_{i=1}^{M} M_{o_i, d}. \tag{11}$$

The conditional probability can thus be modeled as a sum of the pair-wise mutual information values. The B terms are bias values that are modified by the pair-wise correlation, as measured by Mutual Information. Mutual Information is also useful for correlation such as word sense disambiguation.

The B-term is a "bias" value that indicates how common a word is in the entire collection, the prior probability. The most common combinations include unimportant words such as "the", etc. Consequently, "uninteresting" combinations have values close to one. The system 10 uses this fact to reduce or "prune" the number of combinations that need to be stored.

The two Simple Bayes models both add values to the B-term, or bias. Some of the added values are small and can be removed or pruned from the model. A maximum threshold for the B-term is selected for the system 10 and all values below that threshold are removed for the standard case. In other cases, all pairs with an absolute value of the mutual information or logarithm of the conditional probability below a threshold are removed.

In general, it should be necessary to prune only the word prediction model since the other models do not grow to the same sizes. The pruning is performed periodically as the pair-wise counters increase. The system 10 can determine when pruning is necessary by monitoring how much memory is used for storage. Since the system 10 periodically performs the pruning task, the number of pairs will fluctuate. Some pairs that have disappeared can reappear at a later stage if they become more prevalent in subsequent documents.

The Simple Bayes probability estimates are determined through counts in accordance with the system 10. Let $c_i$ be the number of times word i occurs and $c_{ij}$ be the number of times the pair of i and j occur. There are N words in total. The relevant probabilities are:

$$p(y) = \frac{c_y}{N} \quad (12)$$

$$p(x, y) = \frac{c_{x,y}}{N} \quad (13)$$

$$p(y|x) = \frac{c_{x,y}}{c_x} \quad (14)$$

$$\frac{p(y|x)}{p(y)} = \frac{c_{x,y} N}{c_x c_y} \quad (15)$$

Mutual Information is determined as:

$$\log p(y) = \log c_y - \log N \quad (16)$$

$$\log p(x,y) = \log c_{xy} - \log N \quad (17)$$

$$\log p(y|x) = \log c_{xy} - \log c_x \quad (18)$$

$$\log \frac{p(y|x)}{p(y)} = \log c_{x,y} + \log N - \log c_x - \log c_y \quad (19)$$

Some of the counts are going to be very small and thus quite unreliable. Equivalent Sample Size m-estimates of probability are used to add (m) unseen samples from a known distribution. In this case, the system 10 uses a uniform distribution over the number of unique output variables, U. The equations then become as shown:

$$p(y) = \frac{c_y + 1}{N + U} \quad (20)$$

$$p(x, y) = \frac{c_{x,y} + 1}{N + U} \quad (21)$$

$$p(y|x) = \frac{c_{x,y} + 1}{c_x + 1} \quad (22)$$

$$\frac{p(y|x)}{p(y)} = \frac{(c_{x,y} + 1)(N + U)}{(c_x + 1)(c_y + 1)} \quad (23)$$

Mutual Information is determined as:

$$\log p(y) = \log(c_y + 1) - \log(N + U) \quad (24)$$

$$\log p(x,y) = \log(c_{x,y} + 1) - \log(N + U) \quad (25)$$

$$\log p(y|x) = \log(c_{x,y} + 1) - \log(c_x + 1) \quad (26)$$

$$\log \frac{p(y|x)}{p(y)} = \log(c_{x,y} + 1) + \log(N + U) - \log(c_x + 1) - \log(c_y + 1) \quad (27)$$

These adaptations yield a very robust estimate.

The number of counters, $c_x$ and $c_{x,y}$, that need to be stored can be calculated. The number of singular counters, $c_x$, needed is the same as the number of unique output variables, i.e., the number of documents, categories or words. The number of pairs $c_{x,y}$, are determined by considering two factors. First, as for the singular counter, the number of pairs needed is the same as the number of unique output variables. The second factor is the number of unique pair combinations in a window and with an output variable. This will be less than the number of unique words.

A similar probability model is built for a word being predicted by its surrounding words. The same context windows as described previously are used but instead of predicting the document, the system 10 predicts the word in the center of the context window. This allows the system 10 to store and retrieve words relevant to the keyword entered in the search query.

Figure 2:
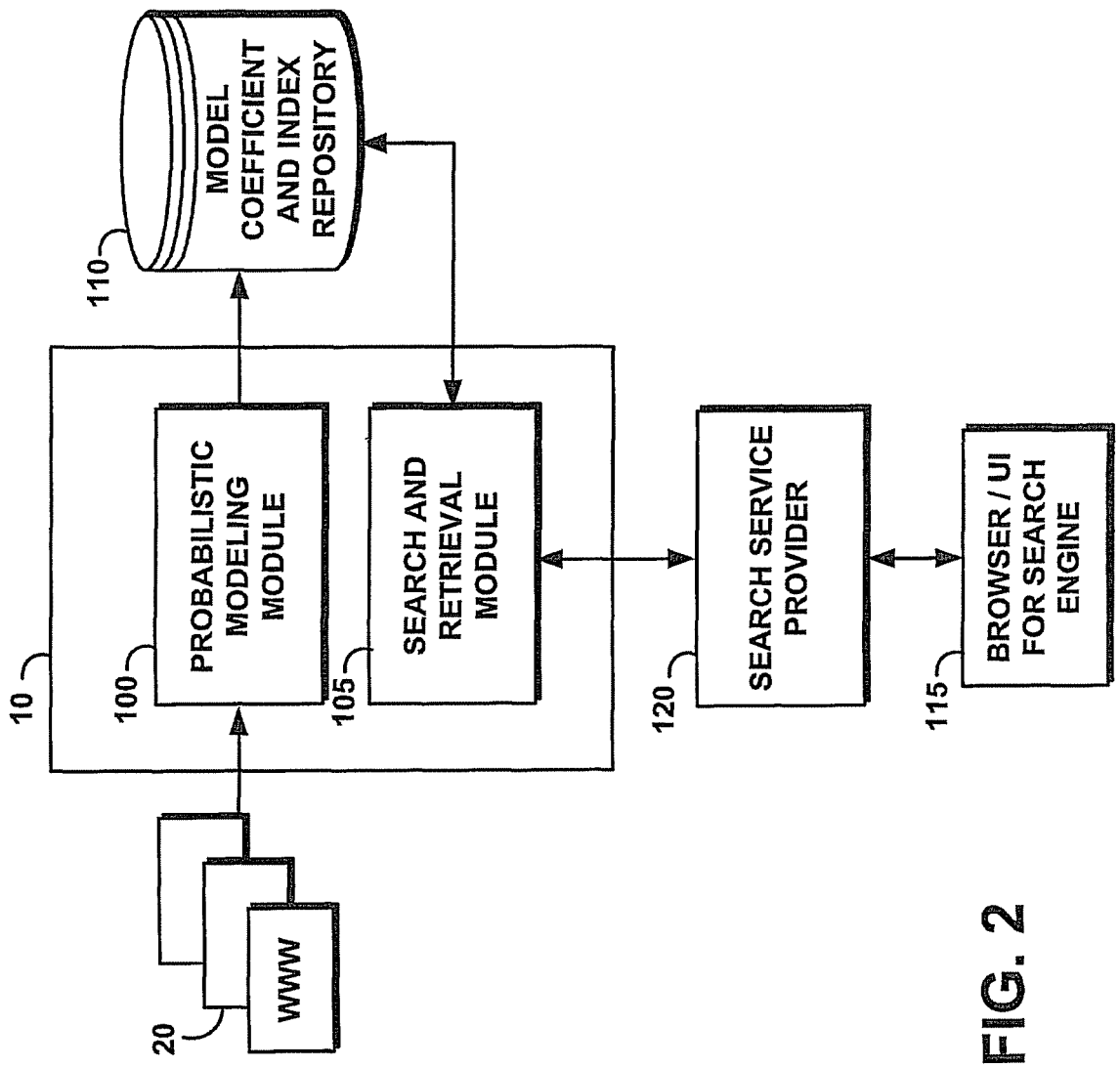
FIG. 2 is a block diagram illustrating the main components of the context-dependent probabilistic modeling system of FIG. 1, shown including a probabilistic modeling module and a user interface.

FIG. 2 illustrates a high level architecture showing the system 10 used in the context of an Internet search. The system 10 includes a probabilistic modeling module 100 and a search and retrieval module 105. The probabilistic modeling module 100 analyzes word content and context for text documents. This document analysis may be performed in conjunction with a web crawler used by an Internet search engine. It may also be performed as the user examines or reads documents by the system 10 which may be installed on a server 15 (FIG. 1), or on a user's computer.

The document characteristics, features, keywords and other specifics are stored in a file-like database, the model coefficient and index repository 110. In one embodiment of the invention, the user accesses the system 10 through a browser interface 115. Keyword search queries are submitted to the search service provider 120. The search and retrieval module 105 retrieves the documents and keywords with the highest probability of matching the user's inquiry.

Figure 3:
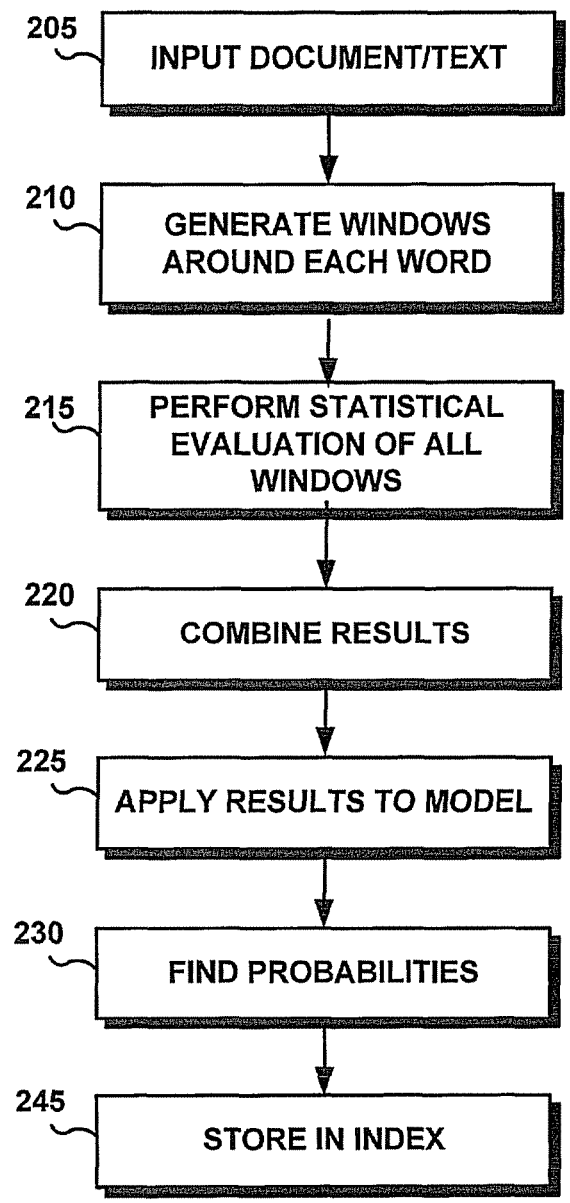
FIG. 3 is a flow chart illustrating a process used by the context-dependent probabilistic modeling system of FIG. 2.

FIG. 3 is a flow chart illustrating the performance of the probabilistic modeling module 100. A text is first input into the probabilistic modeling module 100 at step 205. A set of windows is generated around each word in the document, as indicated at step 210. A statistical evaluation of all the windows and documents is then performed, at step 215. This will include collecting statistical counts of each element in the windows as well the each pair-wise counts, in the example described below. The order of the words within each window is not considered, only the words themselves and the counts of the numbers of each word present. The center word within each window is not contained in the window and the window may be symmetric or asymmetric in size around the center word.

The probabilistic modeling module 100 then combines the results at step 220. An appropriate statistical model, such as Simple Bayes, is generated and applied to the combined results in steps 225 and 230. The probabilistic modeling module 100 then calculates the coefficients Bd, Moi,d, of equation (11) based on the counts, using equations (10) and (10A), either (12) or (20), and either (15) or (23). The coefficients $B_d$, $M_{Oi,d}$, for the document and keyword analysis are stored in the model coefficient and index repository 110 at step 245.

A specific example of the use of the context-dependant probabilistic modeling techniques of step 210 and 215 of FIG. 3 is illustrated as follows. Table 1 below shows an example of two documents, Document 1 and Document 2, each of which containing five words. The task of the model is to associate the windows with the documents. This model is useful for document retrieval and feature extraction. In this case the specific context window membership is not modeled to simplify the presentation.

TABLE 1

Two example documents, each containing five words.

| Document 1 | The quick brown fox slyly |
|---|---|
| Document 2 | Jumped over the lazy dog |

Overlapping windows are created around each word in the documents (step 210). In this example, the window size is minus 2 words to plus 2 words around each word. All possible windows for documents 1 and 2 are shown in Table 2. Statistics about singular word occurrences and pairs are then collected (step 215). In particular, for each window and variable where the variable is the document number:
 1. statistics are collected for each variable; and
 2. pair-wise statistics are collected for variables and each element in the window.

TABLE 2

Possible windows for the words in documents 1 and 2 of Table 1.

| Document | Center Word | Window |
|---|---|---|
| 1 | the | quick brown |
| 1 | quick | the brown fox |
| 1 | brown | the quick fox slyly |
| 1 | fox | quick brown slyly |
| 1 | slyly | brown fox |
| 2 | jumped | over the |
| 2 | over | jumped the lazy |
| 2 | the | jumped over lazy dog |
| 2 | lazy | over the dog |
| 2 | dog | the lazy |

Table 3 shows the statistics collected for each variable. For the first variable, document 1, the single counter finds 5 words in the document. Likewise, for the second document the single counter finds 5 words in the document. For the word "the", the counters find that the word appears seven times in the windows. Likewise, the word "quick" appears 3 times in the windows. The system 10 repeats the counting process for each additional word.

TABLE 3

Statistics collected for words in documents 1 and 2 of Table 1.

| Window | Count |
|---|---|
| Document 1 | 5 |
| Document 2 | 5 |

TABLE 3-continued

Statistics collected for words in documents 1 and 2 of Table 1.

| Words | Count |
|---|---|
| The | 7 |
| quick | 3 |
| brown | 3 |
| Fox | 3 |
| slyly | 2 |
| jumped | 2 |
| over | 3 |
| lazy | 3 |
| Dog | 2 |
| Total Words (N) | 28 |

As shown in Table 4, the pair-wise counter finds that the pair "1-the" appears three times. In other words, the word "the" appears three times in the document 1 windows. Likewise, the word "quick" appears three times in the document 1 windows. The system 10 repeats this process for each pair-wise combination of words within the windows and document numbers and then combines the results in step 220.

TABLE 4

Pair-wise counts for words related to document number for document 1 and 2 of Table 1.

| Pair | Count |
|---|---|
| 1-the | 3 |
| 1-quick | 3 |
| 1-brown | 3 |
| 1-fox | 3 |
| 1-slyly | 2 |
| 2-jumped | 3 |
| 2-over | 4 |
| 2-the | 2 |
| 2-lazy | 3 |
| 2-dog | 2 |

Using the results from the counters shown in Tables 3 and 4, the probabilities can be determined as in step 230 of FIG. 3. The probabilities for any document can be estimated given a number of words, i.e. $p(d|W_1, \ldots, w_n)$. In particular, probabilities are estimated by dividing by N such that $p(x)=C(x)/N$, where $C(x)$ is the number of times x occurs. For example, $p(fox)=3/28=0.1071$. Better estimates for probability are possible using EQU 20-23 such that p(fox) is estimated as $(3+1)/(28+11)=0.1026$.

The system 10 estimates conditional probabilities $p(x|y)$ as $C(x,y)/C(x)$. Therefore, $p(brown|1)$ is $C(1,brown)/C(1)$. For example, $p(1|brown)$ is the probability of finding document "1" if the search word is "brown". Thus $p(1)+p(brown|1)/p(brown)=5/2-8+3/5/3=0.38$. Similarly, for document 2: $p(2|brown)=5/28+0/3/5=0.-18$. Since this model is an approximation, the values don't sum to 1. Normalization is done so that $p(1|brown)+p(2|brown)=1$. Consequently, it is more likely that the document is "1" than "2" if the word is brown. These are the probability characteristics used to categorize the document and determine relative terms in step 235 of FIG. 3.

In order to speed up retrieval of documents and related words in the system a specific database format can be used. To find the conditional probabilities of a word that is related to some other words, e.g., a query, the words that are related to the query words must be known using the probability model.

A list of the words that are related to each other word are stored in the same record. When a word is retrieved from the database then all relative words are retrieved.

These are the pairs that arise from Equations 9 and 11. Since system 10 requires the B and M values of EQUATION 11, these values are stored next to a reference to each word in the database record. For a document retrieval model, the system 10 stores the document identifiers that are related to each word. Using the documents in Table 1 as an example, system 10 in step 245 of FIG. 3 creates the database records shown in Table 5.

TABLE 5

Records for the word "the" and the word "quick" found in documents 1 and 2 of Table 1.

| Key | Record |
|---|---|
| the | B(the), D1, M(the, D1), D2, M(the,D2) |
| quick | B(quick), D1, M(quick,D 1) |

B(the) is the bias value for the word "the" and M(the,D1) is the mutual information value for "the" and document D1. The system 10 uses the same storage method for the model for related words.

Figure 4:
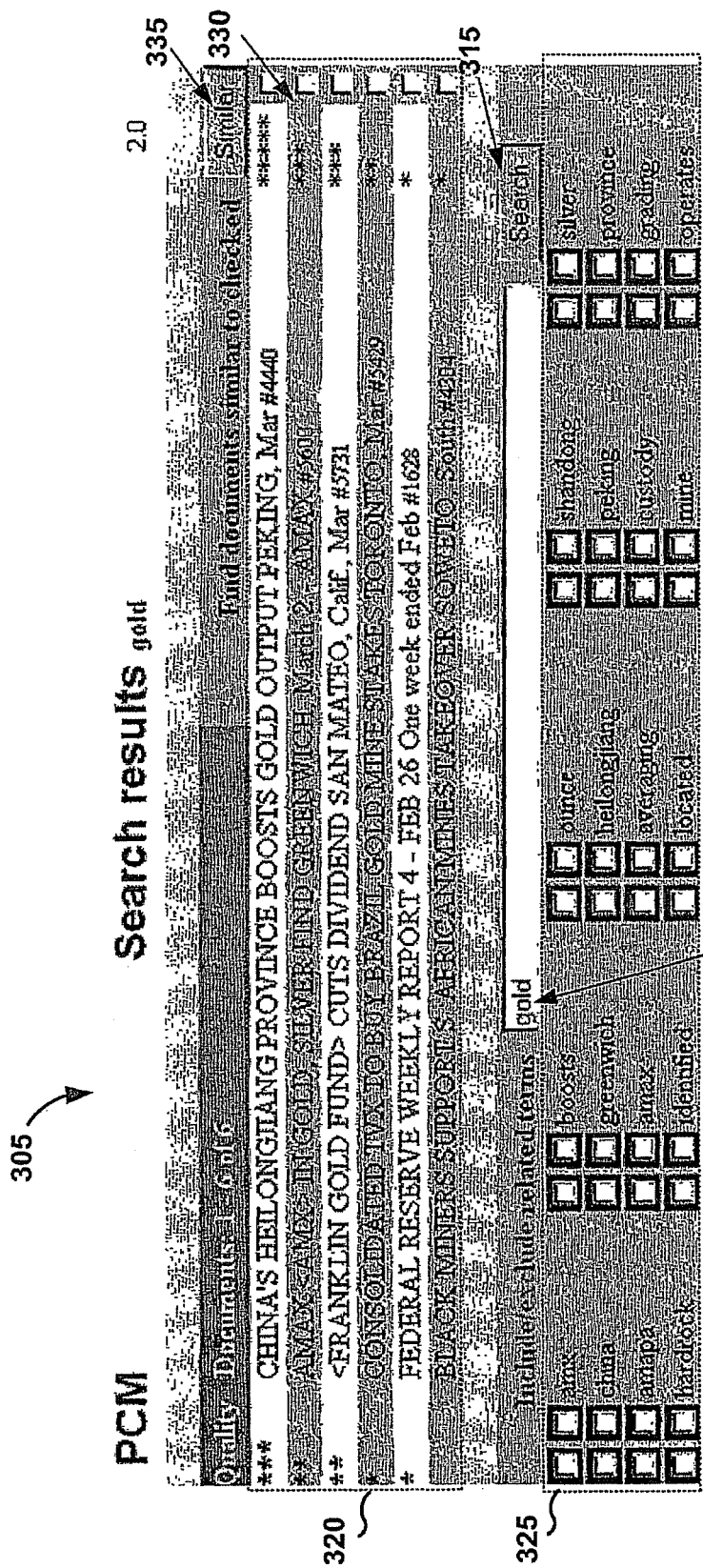
FIG. 4 illustrates an exemplary user interface of the context-dependent probabilistic modeling system of FIG. 2.
Figure 5:
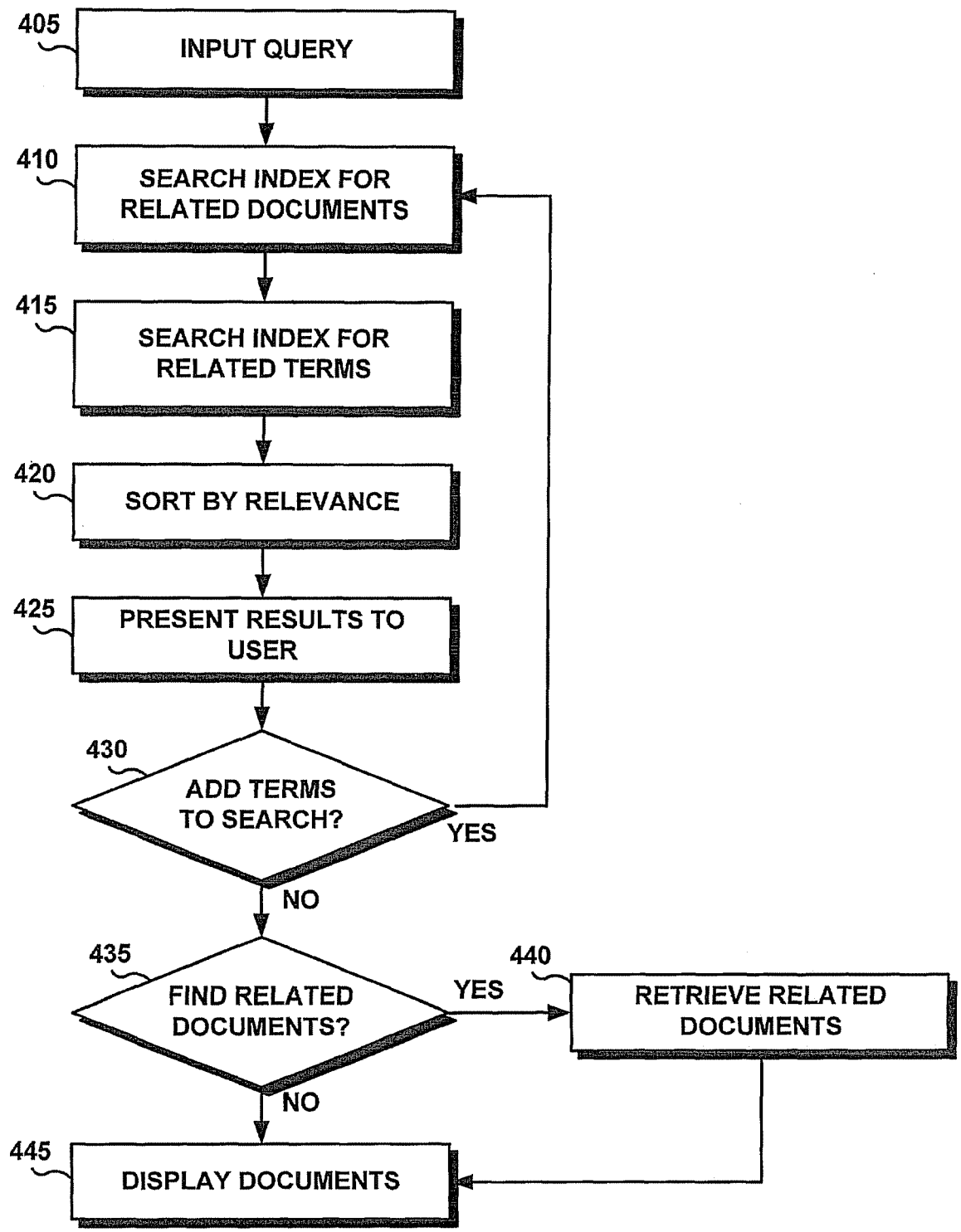
FIG. 5 is a flow chart illustrating a process used by the context-dependent probabilistic modeling system of FIG. 2 in retrieving documents and related keywords according to the present invention.

In operation, and with further reference to FIGS. 2 and 5, a user interface 305 for system 10 is shown in FIG. 4. The user enters in step 405 a search query into the search entry field 310. The user then clicks the search button 315 with the mouse or other entry device of the computer to initiate a search of the model coefficient and index repository 110. The search and retrieval module 105 searches the model coefficient and index repository 110 at step 410 for documents related to the query in character, feature, or keyword. The search and retrieval module 105 also searches the model coefficient and index repository 110 at step 415 for words that appear in conjunction with the keyword entered in the search entry field 310. The related documents and keywords are sorted by relevance in step 420 and displayed to the user at step 425.

Titles for related documents are displayed in the document list 320 while related keywords are displayed in the related terms list 325. The actual probability of a match is shown to the left of the document title in the document list 320 where * is a value between 0-0.2,  is a value between 0.2-0.4, etc. To the right of the document title is a normalized probability where all values are divided by the probability of the highest ranked document. The checkbox 330** to the right of the document title is used to find related documents.

The boxes to the left of the words in the related keyword list allow the user to select additional keywords for search in step 430. Selecting the field or box to the far left of each related term would include that word for the next search; the field or box immediately left of the related term would exclude that word for the search. If additional keywords are selected, the user can press the search button 315 and perform a more refined search by returning to step 410 with the additional keywords added to the original query. The keywords in the related terms list 325 are listed in decreasing order as follows:

$$p_{w(wi|query)}p_w(\text{query}|w_i).\text{query}=q_i \ldots q_n.$$

Because of the independence assumptions:

$$p_w(\text{query}| w_i) = p_w(q_1 \ldots q_n | w_i) = \prod_i p_w(qi | w_i). \quad (28)$$

If the user selects a related documents box 330 and click the "Similar" button 335, as in step 435, the search and retrieval module 105 retrieves document references in step 440 from the model coefficient and index repository 110 that match the indicated document. In step 445, the system 10 displays the results of the modified search to the user.

For example, the user may enter the word "gold" in the search entry field 310. The search and retrieval module 105 retrieves the articles as displayed in the document list 330. A list of related terms is displayed in the related terms list 325. The list of articles shows a wide variety of topics in the documents found, from gold mining to gold funds. The user may select from the related terms list 325 to narrow the search to the topic most desired by the user.

As the probabilistic modeling module analyzes more documents, the vocabulary stored in the model coefficient and index repository increases, allowing a more accurate selection of terms related to the search query. In this respect, the system 10 learns and becomes more efficient with use.

It is to be understood that the specific embodiments of the invention that have been described are merely illustrative of certain application of the principle of the present invention. Numerous modifications may be made to the system and method for context-dependent probabilistic modeling of words and documents for information retrieval and text mining invention described herein without departing from the spirit and scope of the present invention. Moreover, while the present invention is described for illustration purposes only in relation to the WWW, it should be clear that the invention is applicable as well to any electronic collection of text or documents, such as a database.

What is claimed is:

1. A method, comprising:
receiving at least one search term from a user;
automatically determining additional search terms related to the at least one search term at least in part by performing a probability calculation determining a relevance of the additional search terms to the at least one search term using a Simple Bayes probability model developed from analysis of at least one known document, wherein the analysis involves generating a plurality of overlapping vectors corresponding to a plurality of windows centered on a plurality of respective words of the at least one known document by counting a number of occurrences of the plurality of respective words within each window, wherein each respective word on which a window is centered is excluded from a vector generated corresponding to the window, and wherein the probability calculation is performed using at least one processor; and
providing at least one of the additional search terms to the user.

2. The method of claim 1, further comprising providing the user a list of documents automatically determined to be relevant to the at least one search term, the list comprising the at least one known document.

3. The method of claim 2, further comprising receiving a selection of the at least one additional search term from the user, searching documents based on the at least one search term and the at least one additional search term, generating a list of documents automatically determined to be relevant to the at least one search term and the at least one additional search term using the simple Bayes probability model executing on the at least one processor, and providing to the user a subset of the list of documents automatically determined to be relevant to the at least one search term and the at least one additional search term, the subset excluding the at least one known document.

4. The method of claim 1, wherein using the Simple Bayes probability model comprises calculating Mutual Information between the at least one search term and at least one of the additional search terms and calculating bias coefficients representative of how common the at least one search term is in the at least one known document.

5. The method of claim 4, wherein calculating Mutual Information and bias coefficients comprises modeling conditional probability as a sum of pair-wise mutual information values.

6. The method of claim 2, further comprising retrieving at least one document of the list of documents.

7. A computer usable storage medium having computer-executable instructions stored thereon, the computer-executable instructions configured to cause a computer to implement a method when executed, the method comprising:
  for at least one search term received from a user, automatically determining additional search terms related to the at least one search term at least in part by performing a probability calculation determining a relevance of the additional search terms to the at least one search term using a Simple Bayes probability model developed from analysis of at least one known document, wherein the analysis involves generating a plurality of overlapping vectors corresponding to a plurality of windows centered on a plurality of respective words of the at least one known document by counting a number of occurrences of the plurality of respective words within each window, wherein each respective word on which a window is centered is excluded from a vector generated corresponding to the window; and
  providing at least one of the additional search terms to the user.

8. The computer usable storage medium of claim 7, wherein using the Simple Bayes probability model comprises calculating Mutual Information between the at least one search term and at least one of the additional search terms and calculating bias coefficients representative of how common the at least one search term is in the at least one known document.

9. The computer usable storage medium of claim 8, wherein the Mutual Information and bias coefficients are calculated by modeling conditional probability as a sum of pair-wise mutual information values.

10. A processor implemented system, comprising:
  a first module executing on a processor and configured to, for at least one search term received from a user, automatically determine additional search terms related to the at least one search term at least in part by performing a probability calculation determining a relevance of the additional search terms to the at least one search term using a Simple Bayes probability model developed from analysis of at least one known document, wherein the analysis involves generating a plurality of overlapping vectors corresponding to a plurality of windows centered on a plurality of respective words of the at least one known document by counting a number of occurrences of the plurality of respective words within each window, wherein each respective word on which a window is centered is excluded from a vector generated corresponding to the window; and
  a second module configured to provide at least one of the additional search terms to the user.

11. The computer usable storage medium of claim 7, wherein the method further comprises providing to the user a list of documents automatically determined to be relevant to the at least one search term, the list comprising the at least one known document.

12. The computer usable storage medium of claim 11, wherein the method further comprises, in response to receiving a selection of the at least one of the additional search terms from the user, searching documents based on the at least one search term and the at least one additional search term, generating a list of documents automatically determined to be relevant to the at least one search term and the at least one additional search term using the Simple Bayes probability model, and providing the user a subset of the list of documents automatically determined to be relevant to the at least one search term and the at least one additional search term, the subset excluding the at least one known document.

13. The method of claim 1, wherein the plurality of windows comprises a respective window centered on each word of the at least one known document.

14. The computer usable storage medium of claim 7, wherein the plurality of windows comprises a respective window centered on each word of the at least one known document.

15. The processor implemented system of claim 10, wherein the plurality of windows comprises a respective window centered on each word of the at least one known document.

* * * * *